United States Patent
Basu et al.

(10) Patent No.: US 9,036,804 B2
(45) Date of Patent: May 19, 2015

(54) EXTENSIBLE REALTIME DELEGATION FOR CALLS, CONFERENCES AND COLLABORATION

(75) Inventors: Pradipta Kumar Basu, Redmond, WA (US); Brandon V. Taylor, Zürich (CH); Rajesh Ramanathan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1229 days.

(21) Appl. No.: 12/414,687

(22) Filed: Mar. 31, 2009

(65) Prior Publication Data

US 2010/0246450 A1    Sep. 30, 2010

(51) Int. Cl.
*H04M 3/58*   (2006.01)
*H04L 29/06*  (2006.01)
*H04M 3/42*   (2006.01)

(52) U.S. Cl.
CPC ....... *H04L 65/1069* (2013.01); *H04M 3/42042* (2013.01); *H04M 2203/2044* (2013.01); *H04L 65/1006* (2013.01)

(58) Field of Classification Search
CPC ......... H04M 3/54; H04M 3/51; H04M 3/523; H04M 3/5108; H04M 3/42093; H04M 3/58; H04M 3/42212; H04W 88/022; H04L 65/1096
USPC ............. 379/214.01, 202.01, 211.02, 207.15, 379/212.01, 221.01
See application file for complete search history.

(56) References Cited

U.S. PATENT DOCUMENTS

| 5,327,486 | A  | * | 7/1994  | Wolff et al. ................ 379/93.23 |
| 6,205,209 | B1 | * | 3/2001  | Goldberg et al. .......... 379/93.15 |
| 7,085,244 | B2 |   | 8/2006  | Koskelainen et al. |
| 7,130,405 | B2 | * | 10/2006 | Brown et al. ............ 379/210.02 |
| 2004/0006595 | A1 |   | 1/2004 | Yeh et al. |
| 2004/0267938 | A1 |   | 12/2004 | Shoroff et al. |
| 2005/0034079 | A1 |   | 2/2005 | Gunasekar et al. |
| 2005/0047581 | A1 |   | 3/2005 | Shaffer et al. |
| 2007/0097886 | A1 |   | 5/2007 | Schwagmann et al. |
| 2007/0121602 | A1 | * | 5/2007 | Sin et al. ...................... 370/356 |

(Continued)

OTHER PUBLICATIONS

"Conferencing Scenario Call Flows", Retrieved at <<http://technet.microsoft.com/en-us/library/bb964034.aspx>>, May 23, 2008.

(Continued)

*Primary Examiner* — Ahmad F Matar
*Assistant Examiner* — Jirapon Intavong
(74) *Attorney, Agent, or Firm* — Andrew Smith; Peter Taylor; Micky Minhas

(57) ABSTRACT

Architecture for enabling identification of a call party's representative during calls on behalf of the call party. The call representative is delegated to initiate or answer an IP call on behalf of the call party. An IP-telephony component initiates or answers the IP call by the call representative on behalf of the call party. The IP-telephony component can be an IP telephone, or any other suitable IP calling interface. An identification component presents a representation notification identifying the call representative to a connected call party. The representation notification can be displayed on a caller ID display on an IP phone, or can be displayed on a user interface of the personal computing device, for example. The calls can be point-to-point IP calls with a single participant, or can be conference calls with multiple participants, and can be performed with one or more suitable protocols.

20 Claims, 14 Drawing Sheets

(56) References Cited

U.S. PATENT DOCUMENTS

| | | | |
|---|---|---|---|
| 2008/0002820 A1 | 1/2008 | Shtiegman et al. | |
| 2008/0031437 A1* | 2/2008 | Rey | 379/202.01 |
| 2008/0084832 A1 | 4/2008 | Haruna et al. | |
| 2008/0098067 A1 | 4/2008 | O'Sullivan et al. | |
| 2008/0109517 A1 | 5/2008 | Sarkar et al. | |
| 2008/0120692 A1* | 5/2008 | Gupta et al. | 726/1 |
| 2008/0140788 A1* | 6/2008 | Carter et al. | 709/206 |
| 2009/0222747 A1* | 9/2009 | May et al. | 715/764 |
| 2009/0307044 A1* | 12/2009 | Chakra et al. | 705/9 |

OTHER PUBLICATIONS

Wang, et al., "A Context-Based Delegation Access Control Model for Pervasive Computing IEEE", Retrieved at <<http://ieeexplore.ieee.org/iel5/4221005/4224052/04224081.pdf?arnumber=4224081&htry=0>>, IEEE, 2007.

Lacob, et al., "Reference Models for Networked Applications", Retrieved at <<https://doc.telin.nl/dsweb/Get/Document-26677/>>, May 2002, pp. 1-96.

* cited by examiner

EXTENSIBLE REALTIME DELEGATION FOR CALLS, CONFERENCES AND COLLABORATION

BACKGROUND

Enterprise telephony systems such as private branch exchange (PBX) systems typically have a rich set of features over and above basic telephony functions. One such feature is the capability of one user being able to make calls on behalf of another user or entity. In a common scenario, a member of a huntgroup or distribution-group (e.g., a network helpdesk) makes or receives two-party and multi-party calls and conferences on behalf of the huntgroup or distribution group. Internet protocol (IP) office communication systems can enable the aforementioned scenarios in enterprise voice-over-IP (VoIP) telephony systems in which audio/video calls are signaled using a session initiation protocol (SIP).

Busy executives can delegate communication needs to assistants who take care of answering and filtering calls based on priority and relevance. The assistant can also make calls and participate in conferences on behalf of the executive, thus saving the executive time and complexity. In such cases the assistant is acting as a representative of the executive. However, typical PBX telephony systems do not convey this representation to remote parties involved in the conversation. It can be the case that appropriate importance and association is not given to the assistant's call by other parties, for example, ignoring an important, time-sensitive call and allowing the call to be routed to voice mail. This can create difficulty for the executive seeking to delegate communication chores to the assistant.

A similar problem can occur in a huntgroup such as the helpdesk or the finance department of a company, for example, in which many people can answer calls directed to that huntgroup. A person responding to a call to the huntgroup is representing the huntgroup during the call. However, if the person at a later time wants to make a follow up call, typical telephony systems do not enable the person to be identified to the call party as a representative of the huntgroup when calling from the person's own personal line, which can also result in difficulty for a time-sensitive call.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

To that end, a communications architecture is disclosed that allows a call representative to be identified as representing a call party when initiating and receiving calls with a connected call party over an IP-based telephony system. The call party can delegate his/her identity to the call representative, who can then make calls on behalf of the call party. The communications architecture presents identification information of the call representative and the call party to connected call parties, to alert the call parties to delegated calls. For example, an executive can delegate a calling identity to an administrative assistant or other person. The assistant places calls as a representative on behalf of the executive. Persons sending or receiving calls can view a display (e.g., on a telephone caller ID panel or pop-up panel on a computing device) that identifies the assistant by name making the call on behalf of the executive.

The architecture can be used with point-to-point calls between a call representative and a single, connected call party, and can also identify a call representative to a multi-point conference with multiple connected call parties. The call party can be an individual, such as a superior or a coworker. The call party can also be a huntgroup such as a helpdesk or other business unit within an enterprise. The architecture includes components that enable the call party to delegate and authorize representation to the call representative. Further, an extended delegation component can be employed for further delegating an extended call representative to initiate or answer the IP call on behalf of the call party. For example, an assistant can delegate representation of the executive to another coworker for handling direct calls and conferences. This extended delegation can be authorized by the executive.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
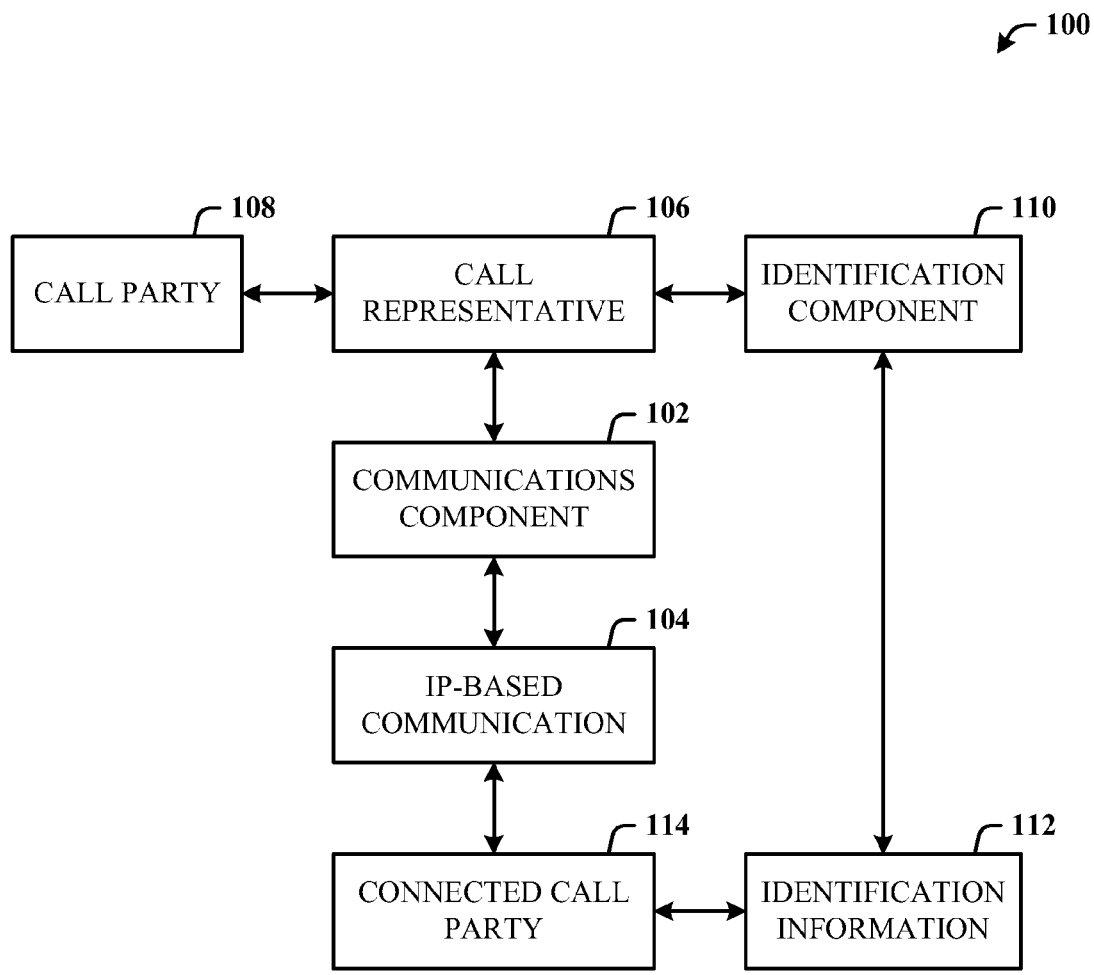
FIG. 1 illustrates a computer-implemented system for performing communications delegation.

The disclosed communications architecture enables delegation for calls, conferences, and collaboration such as the identification of a call party's representative during calls on behalf of the call party. The call representative is delegated to initiate or answer an IP (Internet protocol) call on behalf of the call party. An IP-telephony component initiates or answers the IP call by the call representative on behalf of the call party. The IP-telephony component can be an IP telephone, or any other suitable interface for participating in IP calls, such as a suitably equipped personal computing device running an IP telephony application, for example. An identification component presents a representation notification identifying the call representative to a connected call party of the IP call.

The representation notification can be displayed on a caller ID display on an IP phone, or can be displayed on a user interface of the personal computing device, for example. The calls can be point-to-point IP calls with a single participant, or can be conference calls with multiple participants, and can be performed with one or more suitable protocols. Authorization can also be provided to authorize the identification component to present the representation notification of the call representative to the connected call party.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented system 100 for performing communications delegation. The system 100 enables a call representative to initiate and receive calls on behalf of a call party and identifies the call representative to a connected call party. In this way, the connected call party can become aware of calls made by a representative on behalf of another person, so that the calls are given suitable attention and priority.

As illustrated in FIG. 1, the system 100 includes a communications component 102 for participating in an IP-based communication 104 by a call representative 106 on behalf of a call party 108. The communications component 102 can be an IP telephone or any suitable personal computing device equipped to process calls in accordance with IP telephony. The IP-based communication 104 can be an IP telephone call such as VoIP (voice-over-IP) or any suitable IP-based voice communication. The system 100 also includes an identification component 110 for automatically presenting identification information 112 of the call representative 106 to a connected call party 114 of the IP-based communication 104.

As illustrated in FIG. 1, the call representative 106 can be another user such as an administrative assistant and the call party 108 can be a user such as an executive or other person to whom the call representative is a subordinate, for example. The call representative 106 can also be a coworker or temporary personnel in the event that the call party 108 is unavailable (e.g., out of the office or otherwise away from the phone). The call party 108 can also be a huntgroup within an enterprise, such as a helpdesk or a financial office in which users can initiate and receive calls on behalf of the huntgroup. In these aforementioned scenarios, the IP-based communication 104 can be a party-to-party IP telephone call with a single connected call party.

Figure 2:
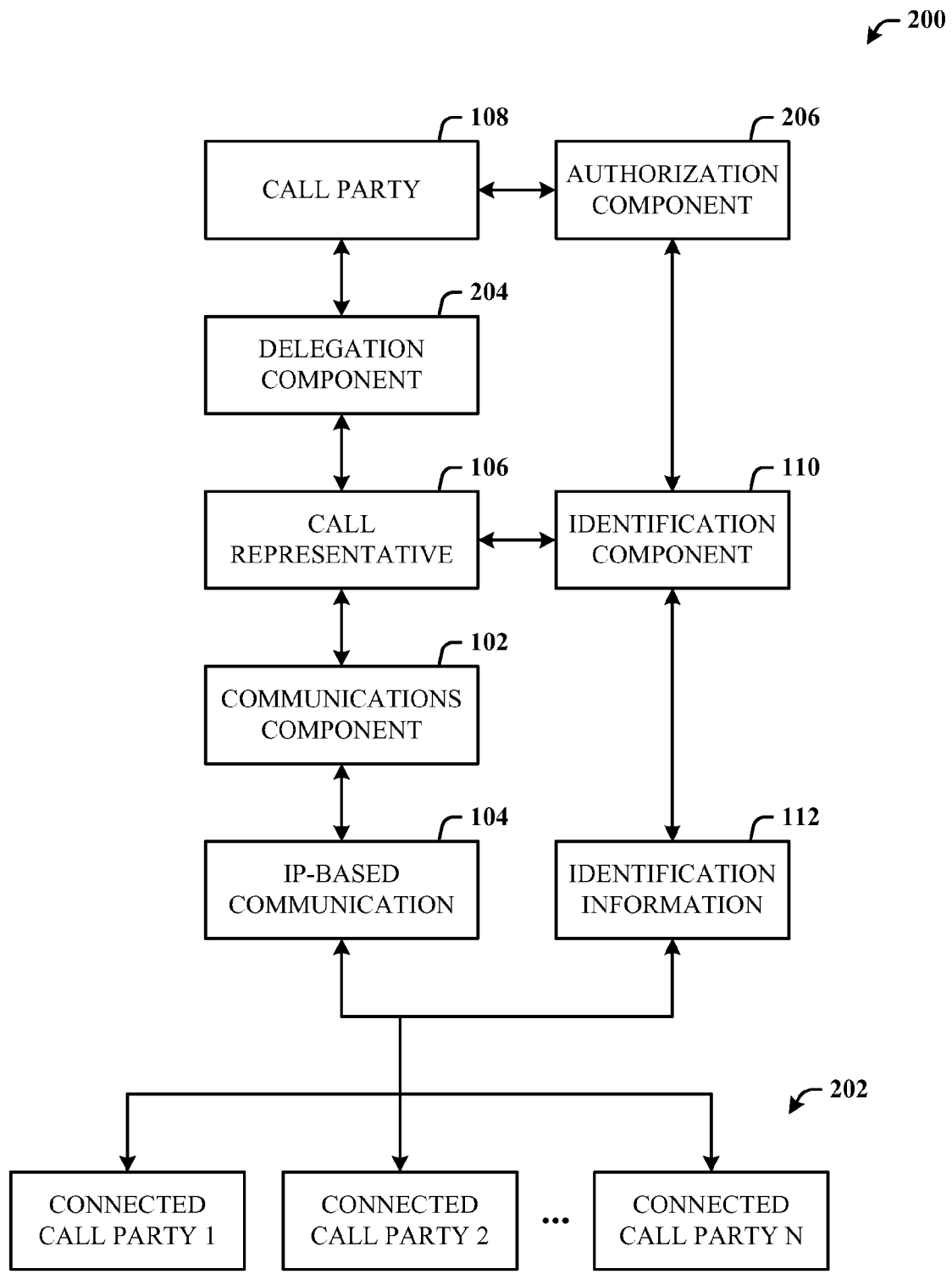
FIG. 2 illustrates additional aspects of the system for performing communications delegation.

FIG. 2 illustrates an alternative embodiment of a system 200 that includes aspects of the system 100 (of FIG. 1) for performing communications delegation. As illustrated, the IP-based communication 104 can include a multipoint conference with multiple connected call parties 202. Here, the identification component 110 presents the identification information 112 to all of the call parties 202 in the conference, to notify the call parties 202 that a participating entity has joined the conference on behalf of another entity. The call representative 106 can thus represent the call party 108 in the multipoint conference and be identified to each of the multiple connected call parties 202.

As illustrated, the system 200 also includes a delegation component 204 for delegating the call representative 106 to initiate or answer the IP-based communication on behalf of the call party 108. In this way, the call party 108 can delegate the call representative 106 to initiate and receive calls, and be identified as the call party 108 while participating in these calls. An authorization component 206 authorizes insertion of the identification information 112 via the identification component 110. The authorization component 206 can thus be used by the call party 108 to authorize the call representative 106 to initiate and receive calls for the call party 108, particularly in scenarios where the call representative 106 performs the delegation operation.

In this manner, the call party 108 can delegate permission to the call representative 106 to take and receive direct point-to-point calls and join conference calls on behalf of the call party 108. The authorization component 206 can also perform authorization of the delegation context that verification that the relationship was properly configured, for example. In other words, that the proper parties (e.g., call party and call representative) are involved in the delegation, that the delegation is for the appropriate session and not a session in which the call representative should participating, and so on.

The subject embodiments provide a mechanism to convey and display information in a phone call that the person calling or being called is representing another entity and/or is joining a conference call on behalf of that entity. Rather than using separate phone lines, the subject embodiments are implemented with a protocol handshake in an IP telephony architecture, so as to allow a person to participate in a call on behalf of another user. In this way, an end user does not have to watch different phone lines, and calls can be presented with sufficient information to alert the participants of a calling party or representative thereof.

Figure 3:
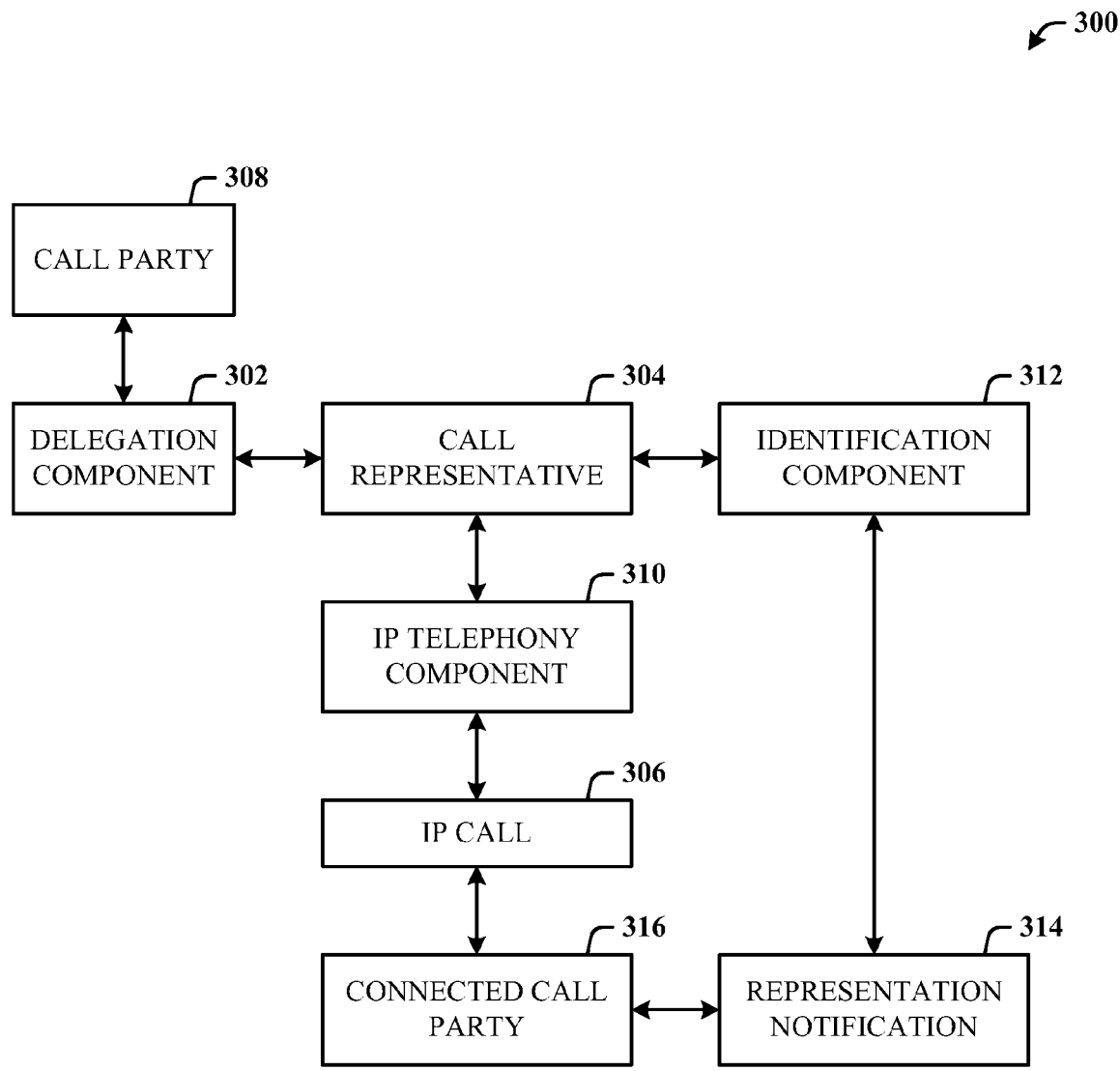
FIG. 3 illustrates an alternative embodiment of the system for performing communications delegation.

FIG. 3 illustrates an alternative embodiment of a system 300 for performing communications delegation. The system 300 includes a delegation component 302 (similar to the delegation component 204 of FIG. 2) for delegating a call representative 304 to initiate or answer an IP call 306 on behalf of a call party 308. An IP-telephony component 310 initiates or answers the IP call 306 by the call representative 304 on behalf of the call party 308. An identification component 312 (similar to the identification component 110 of FIG. 1) presents a representation notification 314 that identifies the call representative 304 to a connected call party 316 of the IP call 306.

As illustrated in FIG. 3, the IP-telephony component 310 can be an IP telephone or any suitable personal computing device equipped to process calls in accordance with IP telephony. The IP call 306 can be an IP telephone call such as VoIP or any suitable IP-based voice communication. The call representative 304 can be an administrative assistant, a coworker, temporary personnel or other person delegated to represent the call party 108 in the event that the call party 308 chooses to have the call representative 304 perform such operation. The call party 308 can be a single user, or a huntgroup within an enterprise, such as a helpdesk or a financial office in which individuals can initiate and receive calls on behalf of the huntgroup. In these aforementioned situations, the IP call 306 can be a party-to-party IP telephone call with a single connected call party.

Figure 4:
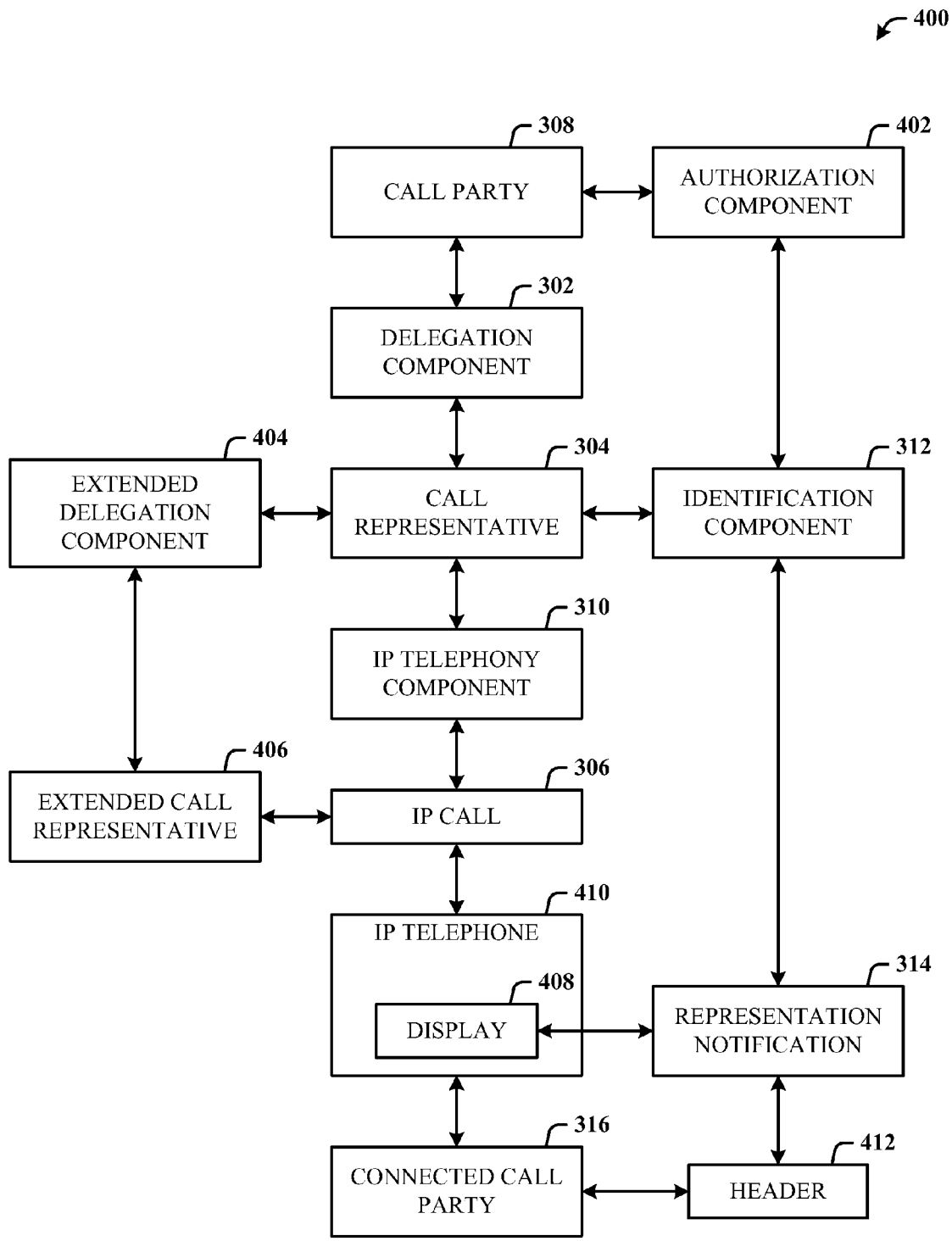
FIG. 4 illustrates further aspects of the system for performing communications delegation.

FIG. 4 illustrates an alternative embodiment of a system 400 that includes the system 300 (of FIG. 3) for performing communications delegation. An authorization component 402 enables the call party 308 to authorize the identification component 312 to present the representation notification 314 of the call representative 304 to the connected call party 316. The call party 308 can use the authorization component 402 to authorize the call representative 304 to initiate and receive delegated (or "on behalf") calls, especially in situations where the call representative 304 delegates representation.

FIG. 4 also illustrates an extended delegation component 404 for further delegating an extended call representative 406 to initiate or answer the IP call 306 on behalf of the call party 308. For example, an authorized assistant can further delegate another person to represent the executive in a call, in the event the assistant is unavailable, for example. The executive can perform the extended delegation, or can authorize that extended delegation be performed by the assistant, for example. In this manner, delegation can be a sequential chain of delegation, enabling the call party 308 to be represented in the event of personnel unavailability.

FIG. 4 also illustrates a display component 408 for displaying the representation notification 314 of the call representative 304 on an IP telephone 410 belonging to the connected call party 316. The display component 408 can be a telephone caller ID panel or computer interface, for example, that displays the representation notification 314 thereon. For example, for an assistant designated ASSIST1 representing an executive named EXEC1, the display component 408 can present "ASSIST1 on behalf of EXEC1".

FIG. 4 further illustrates a header 412 for presenting the representation notification 314 to the connected call party 316. The header 412 is used in messages sent within the communications system 400 and is processed to indicate to the recipient (the connected call party 316) that the caller on the connection is representing another caller. The header 412 is explained in detail hereinbelow.

The embodiments described above and herein also support the broader utilization of the disclosed "on-behalf-of" architecture for different modalities and operations. For example, a representative can be designated (or configured) to send and/or receive instant messages on behalf of a designated messaging party. In another implementation, a representative can be designated to configure desktop sharing on behalf of another. The above scenarios can employ various levels of security to assure that only the proper users are authorized to perform such operations.

In the same context, a designated representative can be delegated the authority to schedule meetings and other meeting or session functions such as session termination, record keeping and storage, session document dissemination, invite attendees, and so on, based on the header 412.

The disclosed "on-behalf-of" architecture also accommodates delegation in modality chaining. For example, if a voice channel is started by the representative on behalf of the delegating party, other modalities such as instant messaging and application sharing, for example, can be enabled on behalf of the delegating party as well. Moreover, if the call is transferred, the on-behalf-of context can be maintained. These capabilities can be managed according to rules or other criteria in order to provide the desired security and/or functionality management.

For example, a rule can be employed that if the representative attempts modalities other than the modality of delegating party, the attempt will fail. Similarly, if the representative attempts to employ operations that can threaten the security of the session or session participants, a rule executes to make the attempt fail. Such delegation actions of the representative and/or associated delegating party can be recorded or logged for historical purposes (e.g., legal).

The disclosed "on-behalf-of" architecture also accommodates the use of permissions to control not only representative actions but also actions of the delegating party. For example, if user X is calling on behalf of user Y, and user A has given permission to user Y to interrupt user A, then user X is able to interrupt user A based on the header 412, also referred to as a P-session-on-behalf-of header. The permissions can also be linked to the particular context in which the delegation occurs. The disclosed "on-behalf-of" architecture also maintains the change in context during delegation during transfer, and so on. For example, if user X is calling user A on behalf of user Y, and user Y wants to transfer user X to user B, then user X creates the new triggered invite with the P-session-on-behalf-of header and the call still remains "on-behalf-of". Conversation history can also be maintained.

The delegation component 302 facilitates extending delegation of the call to further include the delegation of new modalities that are accessible by the call party. The new modalities can comprise messaging, content sharing, recorded information, collaboration information, and application sharing, for example.

Figure 5:
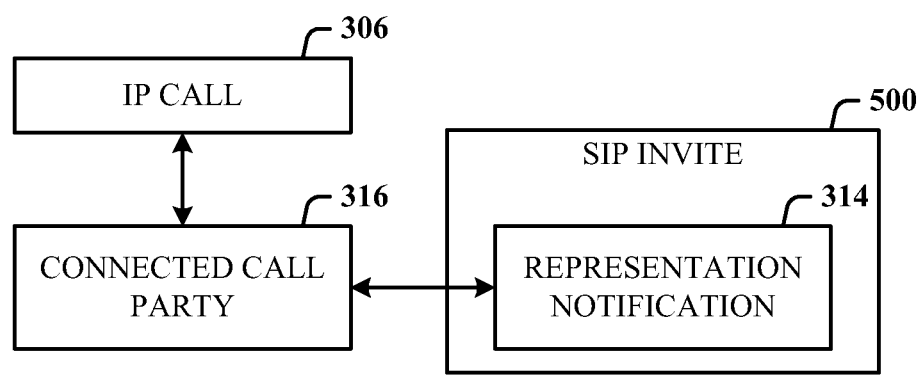
FIG. 5 illustrates inclusion of a representation notification in a SIP Invite message for initiating IP calls to a single connected party.

FIG. 5 illustrates aspects of including the representation notification 314 in a session initiation protocol (SIP) invite 500 for initiating IP calls to a single connected call party 316. The SIP invite 500 is an INVITE message in part of a protocol handshake sent at the commencement of an IP telephony session. The SIP INVITE 500 contains the header 412 (of FIG. 4) that indicates to the connected call party 316 that the initiator of the request is representing another user. The representation notification 314 is initially authorized by the server and enclosed within the header 412, which are included with the SIP INVITE 500 forwarded in a situation where the call representative 304 is initiating a call on behalf of the call party 308 to the connected call party 316.

In an implementation of the disclosed embodiments, the call representative 304 can be a communication client that communicates using multiple identities. Upon log-in, the communication client sends a SIP REGISTER message with the primary identity of the call representative 304 and conveys the alternate identity information of the call party 308 as included in the representation notification 314. When a call is initiated on behalf of the call party 308 or when joining a conference, the SIP INVITE 500 includes the representation notification 314. The other user(s) involved in the IP call 306 receive the representation notification 314 either through SIP dialogue between users or through conference documents sent by the conference control center to all participants in the conference.

When an assistant initiates a call on behalf of another user (e.g., a supervisor) using a communication client, the SIP INVITE 500 will contain the header 412 that indicates to the recipient that the initiator of the request is representing another user. Similarly, a huntgroup member uses the header 412 including the representation notification 314 in INVITE requests to indicate that the user is acting in the capacity of a member of the huntgroup.

Figure 6:
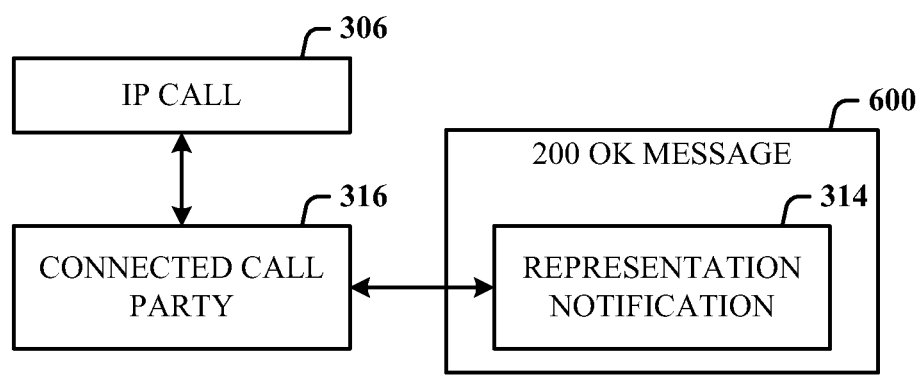
FIG. 6 illustrates inclusion of a representation notification in a SIP OK message for answering IP calls from a single connected party.

FIG. 6 illustrates aspects of including a representation notification 314 in a 200 OK message 600 for answering the IP call 306 from a single connected call party 316. The 200 OK message 600 is sent to a caller from a recipient at the commencement of an IP telephony session. The 200 OK message 600 also contains the header 412 (of FIG. 4) that indicates to the connected call party 316 that the recipient of the call is representing another user. The representation notification 314 is enclosed within the header 412, and is included with the 200 OK message 600 forwarded to the connected call party 316 in a scenario where the call representative 304 is receiving a call on behalf of the call party 308 to the connected call party 316.

Further to the aforementioned implementation, when the IP call 306 is received on behalf of the call party 308, the 200 OK message 600 includes the representation notification 314, so that the connected call party 316 is notified that the call representative 304 is taking the call on behalf of the call party 308. When the assistant answers a call made by the caller to the supervisor and the call reaches the assistant's communication client, the 200 OK message 600 generated by the client will contain the header 412 with the representation notification 314 to convey to the caller that the delegated call was answered by another person. Similarly, the IP call 306 received by a huntgroup member includes the header 412 in the 200 OK message 600 to indicate that the member is acting in the capacity of a member of the huntgroup.

To ensure security of the aforementioned implementation, a communication server receiving an SIP INVITE 500 or a 200 OK message 600 that includes the header 412 with the representation notification 314 performs an authorization check to ensure that the calling or answering identity has the permission to make or answer calls on behalf of the identity that it represents. Authorization is performed by the server that is at the first hop for receiving the outgoing SIP INVITE 500 or 200 OK message 600. The server authorization is performed in real-time so that if the permission to make or receive delegated calls has been revoked, the SIP INVITE 500 or 200 OK message 600 is not forwarded by the home server to its destination.

Figure 7:
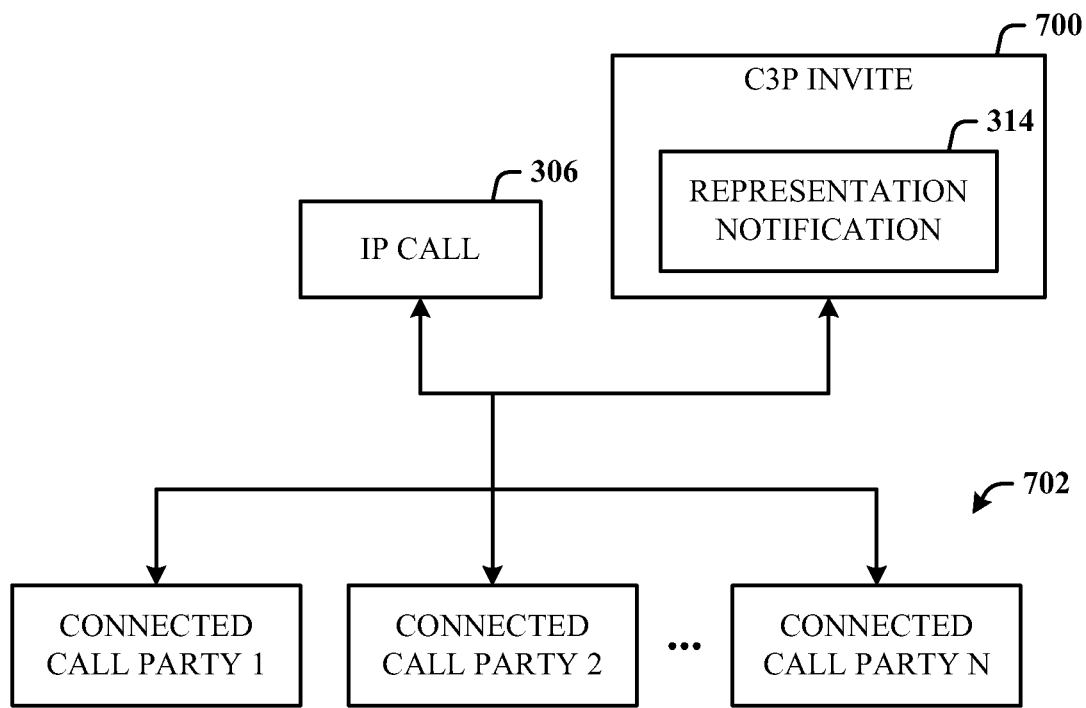
FIG. 7 illustrates inclusion of a representation notification in a C3P invite for joining IP conference calls with multiple connected parties.

FIG. 7 illustrates aspects of including representation notification 314 in a centralized conferencing control protocol (C3P) invite 700 for joining the IP call 306 with multiple connected parties 702. The C3P invite 700 is similar to the SIP INVITE 500 (of FIG. 5) as described hereinabove, but as applied to IP conference calls. As illustrated, the C3P invite 700 presents the representation notification 314 to the multiple call parties, enabling the call representative 304 to be identified with the call party 308 in the conference call. The C3P is a protocol for communicating conference creation and control commands from clients to a conference server. The C3P commands can be carried as XML data in SIP messages. Additionally, C3P is agnostic to the underlying transport protocol and to information being conveyed on the transport level. Thus, rather than employing the P-session-on-behalf-of information in an outside entity, such header information can be communicated inside conversations.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
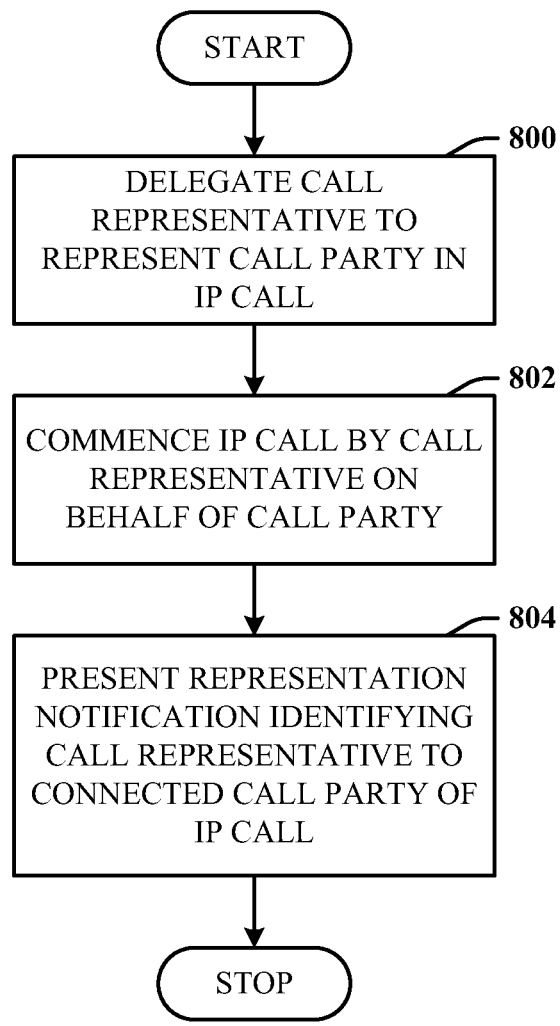
FIG. 8 illustrates a method of communications delegation.

FIG. 8 illustrates a method of communications delegation. At 800, a call representative is delegated to represent a call party in an IP call. At 802, the IP call is commenced by the call representative on behalf of the call party. At 804, a representation notification identifying the call representative is presented to a connected call party of the IP call. The method can further include maintaining delegation context when transferring the call between the call representative and the call party, and/or applying permissions allowed by the call party to the connected call party, to the call representative.

Figure 9:
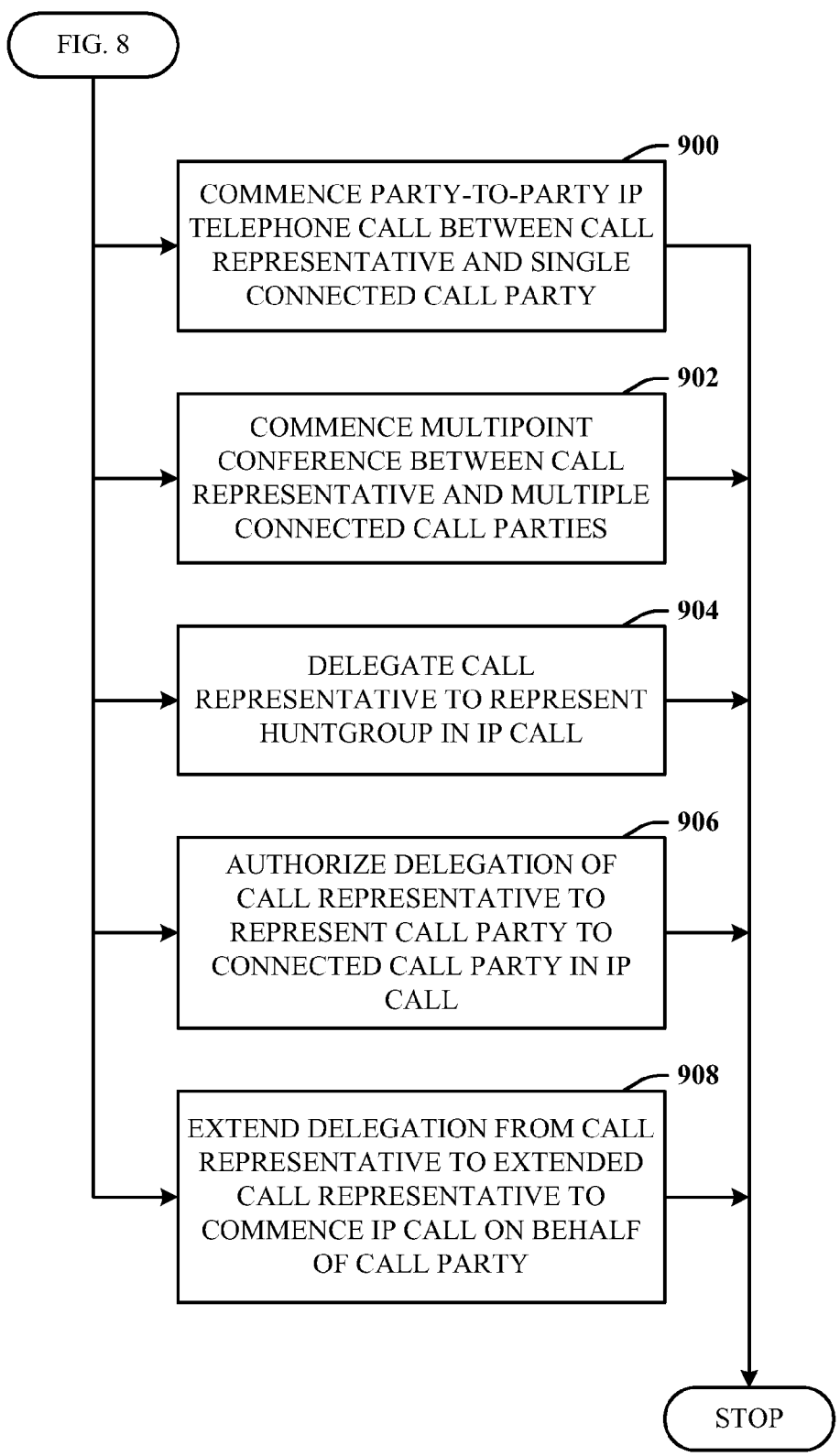
FIG. 9 illustrates further aspects in the method of communications delegation of FIG. 8.

FIG. 9 illustrates further aspects in the method of communications delegation of FIG. 8. At 900, a party-to-party IP telephone call is commenced between the call representative and a single connected call party. Alternatively, at 902, a multipoint conference is commenced between the call representative and multiple connected call parties. At 904, the call representative is delegated to represent a huntgroup in the IP call. At 906, the call representative is delegated to represent the call party to the connected call party in the IP call. At 908, delegation is extended from the call representative to an extended call representative to commence the IP call on behalf of the call party.

A method in accordance with the herein disclosed embodiments can be implemented in the following manner. A communication client device used by the assistant can exchange messages with an IP telephony server, which retains IP addresses for the assistant and the delegating user (e.g., an executive). When a caller initiates a call to the delegating user, the server forwards an INVITE message to the delegating user's IP address, on the delegating user's home server. If the delegating user has set the delegation to an assistant, the delegating user's home server forwards the INVITE message to the assistant's IP address, residing on the assistant's home server.

The delegating user or the assistant can set call handling rules that are retained on the home servers of the assistant and the delegating user. An incoming call can be received by both the assistant and the delegating user, or just the assistant, for example. In a situation where the incoming call is received by the assistant, the caller can perceive "on behalf" identification information displayed through a visible header. The assistant can be registered directly as the delegating user on the delegating user's home server, and indicate identity as a secondary identity, for example.

The delegating user can logon to multiple client devices, such as a desktop and two laptops, for example. All these clients can be registered on the delegating user's home server. The assistant's client can be registered on the delegating user's home server, but as a secondary registration. The delegating user's home server can regard the assistant as another endpoint of the delegating user's identification. Calls sent to the delegating user's endpoints will then also be sent to the assistant's client.

The delegating user can set rules for delegating that can assign delegation during certain times of the day. For example, the delegating user can delegate the assistant to represent calls during certain hours or days and can receive personal calls at other times. Alternatively, a network administrator can establish override conditions for certain rules, if the rules violate enterprise policies, for example. The network administrator can configure IP addresses for members of the organization. For example, IP addresses can be assigned for the delegating user and two delegates, with different routing rules for each. These rules cannot then be changed by the delegating user or the assistant, but can be selectively enabled and disabled, for example.

Figure 10:
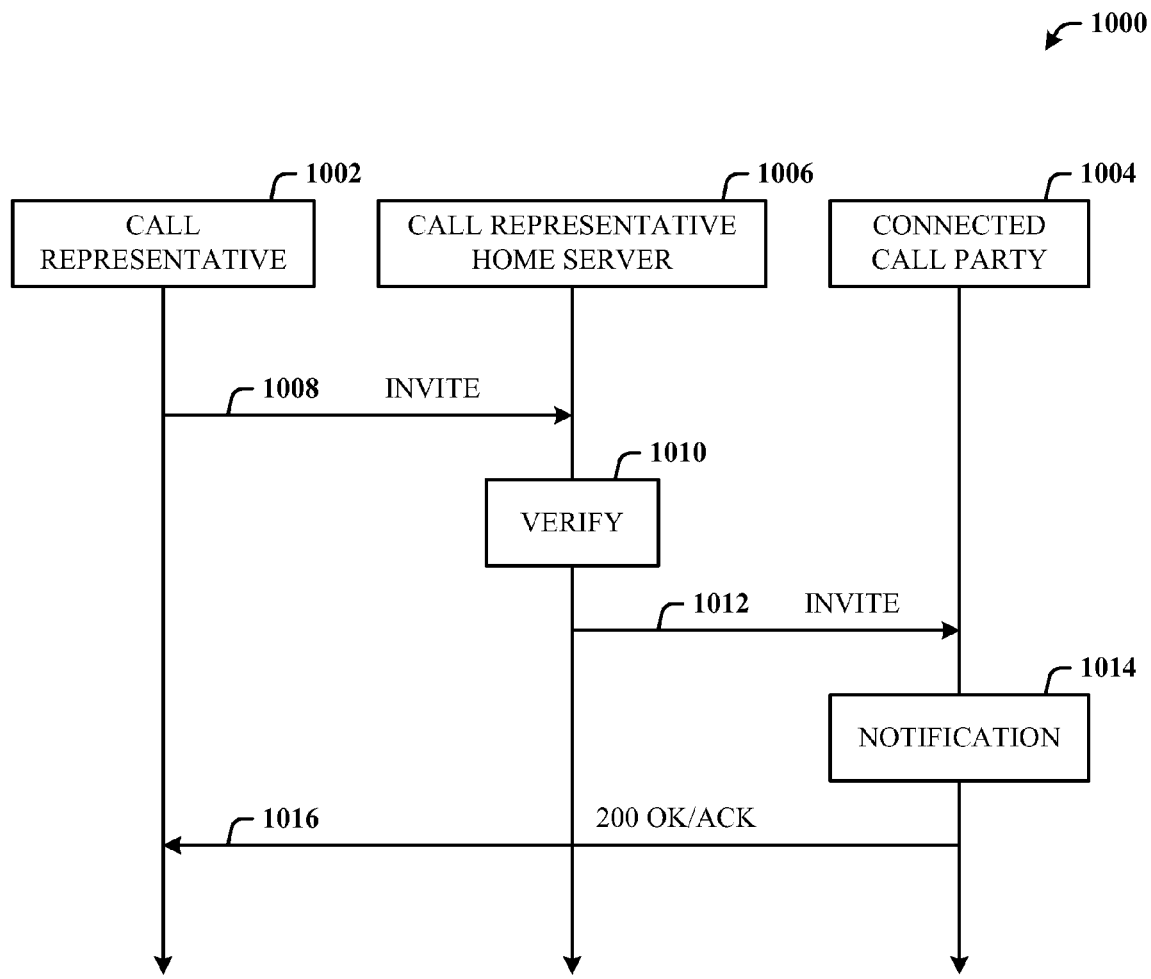
FIG. 10 illustrates a call flow diagram for an IP call in which a call representative initiates a call to a connected call party on behalf of a call party.

FIG. 10 illustrates a call flow diagram 1000 for an IP call in which a call representative 1002 (referred to here as CallRep) initiates a call to a connected call party 1004 (referred to a Recip) on behalf of a call party (referred to as Del). A call representative home server 1006 to which the call representative 1002 is connected (e.g., logged into) performs a validation that the call representative 1002 is authorized to make calls on behalf of Del.

As illustrated in FIG. 10, CallRep initiates a call to a connected call party 1004 on behalf of Del. A SIP INVITE message 1008 is sent from the call representative 1002 to the call representative home server 1006. The SIP INVITE message 1008 can include the following content:

Req-URI: sip:Recip@nowhere-domain.com
    From: sip:CallRep@nowhere-domain.com
    To: sip:Recip@nowhere-domain.com
    P-Session-On-Behalf-Of: sip:Del@nowhere-domain.com The INVITE message 1008 includes typical content used in making an IP call, with the addition of the header "P-session-on-behalf-of" that includes a presentation identity associated with the called party for whom the call representative 1002 is identified (the email address Del@nowhere-domain.com). The presentation identity can be presented "as is" to the connected call party 1004 or can be replaced with associated data from a lookup table, such as Del's full name and title, for example.

As illustrated in FIG. 10, upon receiving the INVITE message 1008, the call representative home server 1006 uses an assistant list associated with the delegating user to verify 1010 that the assistant is authorized to initiate and receive calls on behalf thereof. A forwarded INVITE message 1012 includes the same content, and the INVITE message 1008 is forwarded to the connected call party 1004. A notification 1014 is presented to the connected call party 1004 indicating the call representative 1002 and the call party, "CallRep on behalf of Del", for example.

The notification 1014 can be presented on a caller ID display of an IP phone of the connected call party 1004. Alternatively, for the connected call party 1004 using a personal computing device with a graphical user interface, the notification 1014 can be shown on a user-notification pop-up and/or on the conversation-window roster on a client device. This assists the remote party (e.g., Recip) in determining whether to grant priority in answering the call.

As illustrated in FIG. 10, in response to the call, a 200 OK/ACK message 1016 is sent back from the connected call party 1004 to the call representative 1002, and the call is commenced. For an incoming call from the connected call party 1004, the delegating user's home server receives an INVITE message and forwards the INVITE message to the call representative home server 1006. A 200 OK message is sent that includes the header with the notification 1014 to alert the caller that the assistant is representing the call party.

Figure 11:
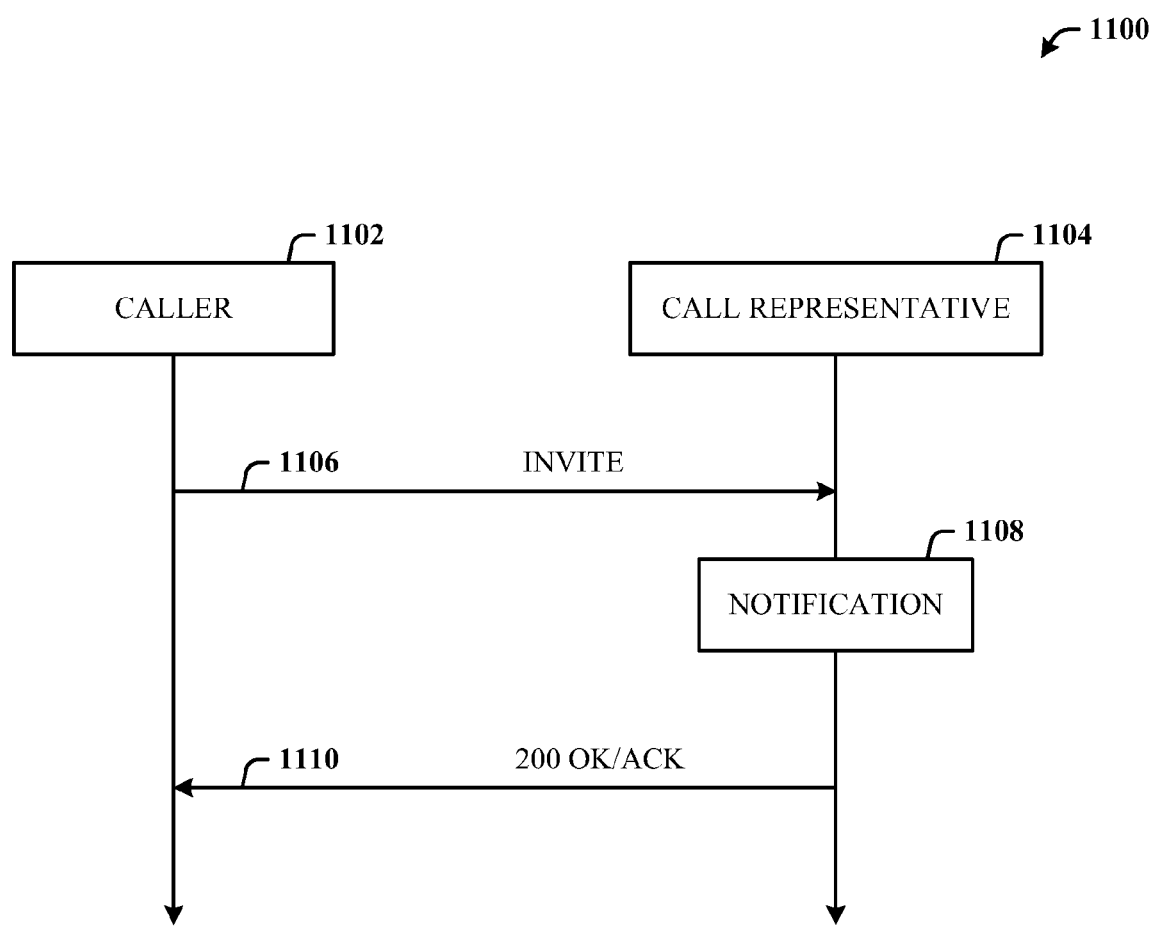
FIG. 11 illustrates a call flow diagram for an IP call in which the call representative receives a call on behalf of a huntgroup.

FIG. 11 illustrates a call flow diagram 1100 for an IP call in which the call representative receives a call on behalf of a huntgroup. The call is made from a caller 1102 (e.g., Recip) to helpdesk@ nowhere-domain.com, which is picked up by a call representative 1104, a huntgroup member at the helpdesk (also referred to as Mem). An SIP INVITE message 1106 is sent that includes the following content:

Req-URI: sip:Mem@nowhere-domain.com
    From: sip:Recip@nowhere-domain.com
    To: sip:Helpdesk@nowhere-domain.com Upon receiving the INVITE message 1106, the call representative 1104 receives a notification 1108, which can be "Call to Helpdesk from Recip". When the call representative 1104 picks up, a 200 OK/ACK message 1110 is sent that includes the following content:

From: sip:Recip@nowhere-domain.com
    To: sip:Helpdesk@nowhere-domain.com
    P-Asserted-Identity: sip:HelpUser@nowhere-domain.com
    P-Session-On-Behalf-Of: sip:Helpdesk@nowhere-domain.com In this manner, HelpUser is identified by Recip as representing the helpdesk. This identity can be presented again to Recip if HelpUser initiates a follow-up call representing the Helpdesk.

Huntgroup representation can be distinguished from delegated representation by inserting an additional parameter into the header that describes the reason for the representation session. Examples include:

P-Session-On-Behalf-Of: sip:Del@nowhere-domain.com; reason=delegation
    P-Session-On-Behalf-Of: sip:helpdesk@nowhere-domain.com; reason=huntgroup This can be especially useful for personnel that belong to huntgroups and are delegated to represent delegating users or other persons.

Figure 12:
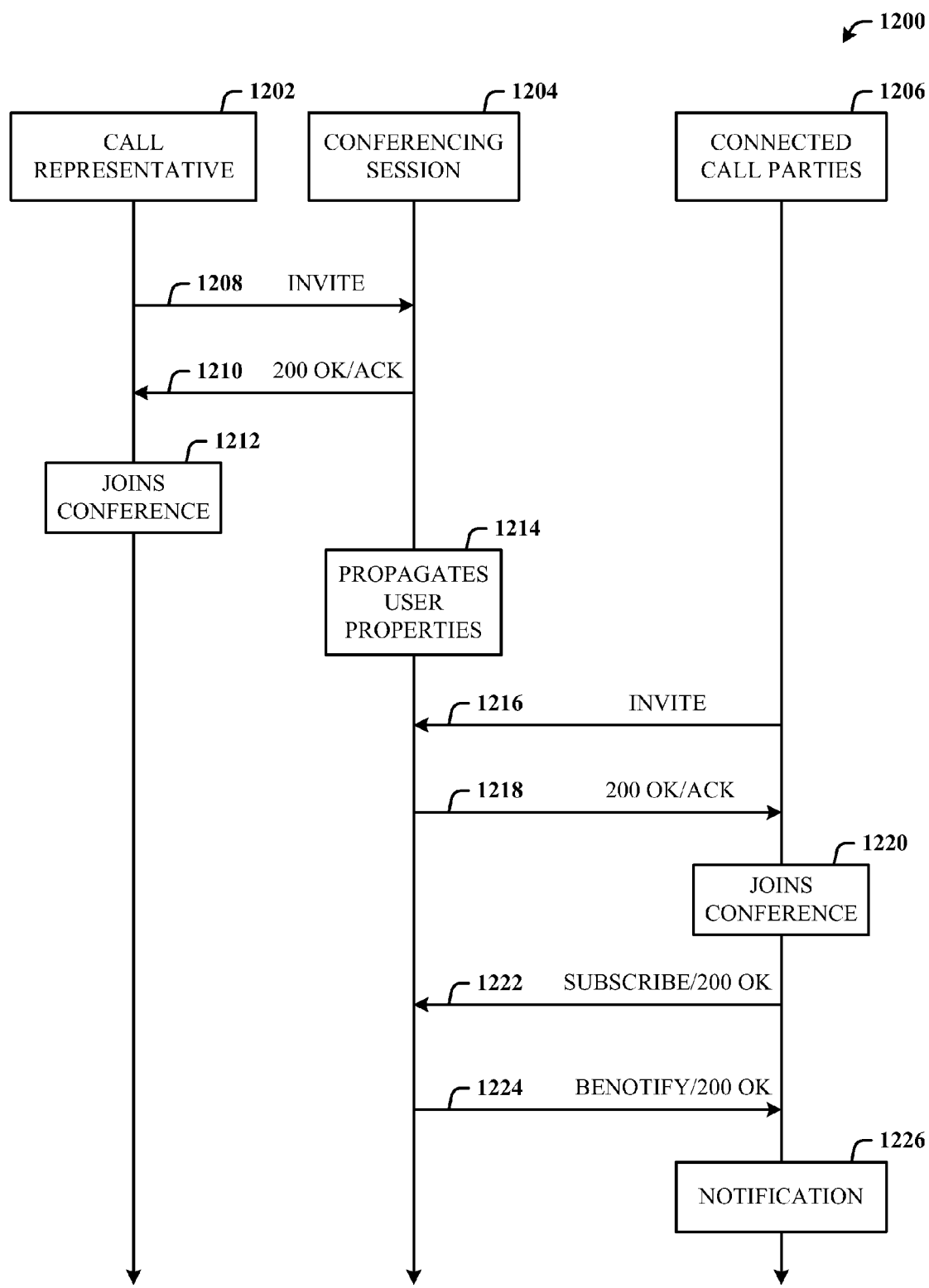
FIG. 12 illustrates a call flow diagram for an IP call in which the call representative joins a conferencing session with multiple connected call parties on behalf of the call party.

FIG. 12 illustrates a call flow diagram 1200 for an IP call in which a call representative 1202 joins a conferencing session 1204 with multiple connected call parties 1206 on behalf of the call party. The call representative 1202 joins the conferencing session 1204 by sending a SIP INVITE message 1208 which can include the following content:

Req-URI: sip:CallRep@nowhere-domain.com SESSION GRUU
    From: sip:CallRep@nowhere-domain.com
    To: sip:CallRep@nowhere-domain.com SESSION GRUU
    P-Session-On-Behalf-Of: sip:Del@nowhere-domain.com
    C3P AddUser It is to be appreciated that "SESSION GRUU" refers to a particular globally routable user agent URI (GRUU) used for the conferencing session 1204, but any suitable SIP message for joining a multiple party conference can be used. The conferencing session 1204 replies to the INVITE message 1208 by sending a 200 OK/ACK message 1210, whereupon the call representative 1202 joins the conference 1212. The conferencing session 1204 propagates user properties 1214 to the connected call parties 1206, including the "P-Session-On-Behalf-Of" properties.

Upon joining a conference on behalf of a call party, the INVITE message 1208 from the call representative 1202 to the conference session 1204 includes a header that denotes the "on-behalf-of" relationship between the call representative 1202 and the call party. A conferencing session server looks inside the body of the INVITE message to ensure that the contents are the same as in the header. If the contents agree, the information is safely transmitted to the connected call parties 1206. Upon confirmation, the conferencing session server transmits the information from the body and begins to relay the voice messages of the call representative 1202.

Each of the connected call parties 1206 sends an INVITE message 1216 to the call representative 1202 upon joining the conference. The INVITE message 1216 can include the following content:

Req-URI: sip:CallRep@nowhere-domain.com SESSION GRUU
From: sip:Recip@nowhere-domain.com
To: sip:CallRep@nowhere-domain.com SESSION GRUU
C3P AddUser A 200 OK/ACK message 1218 is sent to confirm that the call representative 1202 is exchanging messages. When a new connected call party joins the conference, at 1220, a SUBSCRIBE 200 OK message 1222 is sent to the conferencing session 1204 with the following content:
SUBSCRIBE/200 OK
C3P Conference Doc The information of all other participants is sent to the new joining participant in respective BENOTIFY messages. For the call representative 1202, the conferencing session 1204 conveys BENOTIFY message 1224 with the following content:
BENOTIFY/200 OK
C3P Conference Info
user entity="sip:mindy@nowhere-domain.com"
P-Session-On-Behalf-Of: sip:Del@nowhere-domain.com In this manner, the BENOTIFY message 1224 sent with the conference document transmits a notification 1226 to the conference participants that the call representative 1202 is participating on behalf of the call party (e.g., CallRep on behalf of Del). This information is then part of the user properties of the call representative 1202 during the conferencing session 1204.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 13:
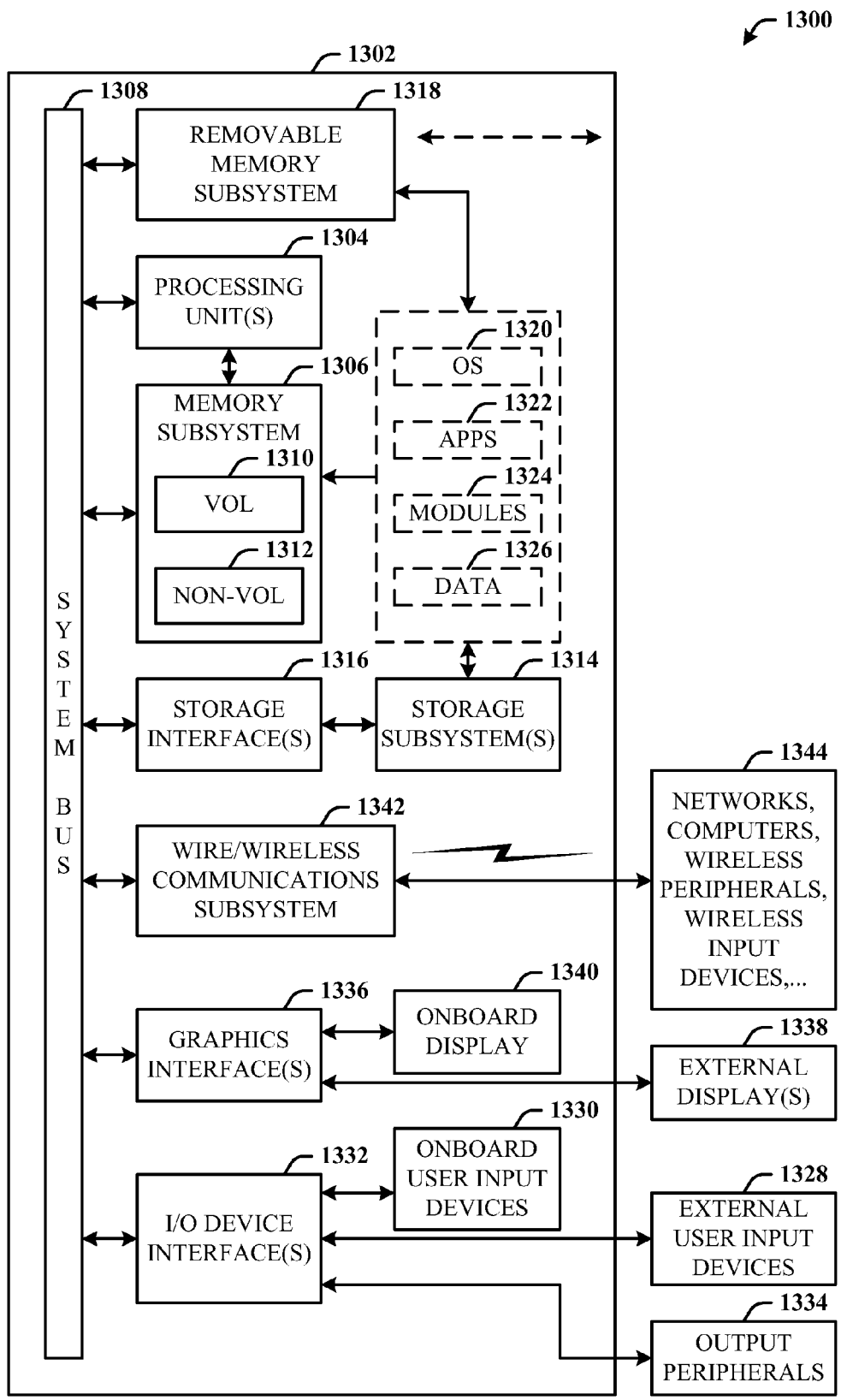
FIG. 13 illustrates a block diagram of a computing system operable to execute the communications delegation in accordance with the disclosed architecture.

Referring now to FIG. 13, there is illustrated a block diagram of a computing system 1300 operable to execute communications delegation in accordance with the disclosed architecture. In order to provide additional context for various aspects thereof, FIG. 13 and the following discussion are intended to provide a brief, general description of the suitable computing system 1300 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1300 for implementing various aspects includes the computer 1302 having processing unit(s) 1304, a system memory 1306, and a system bus 1308. The processing unit(s) 1304 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1306 can include volatile (VOL) memory 1310 (e.g., random access memory (RAM)) and non-volatile memory (NON-VOL) 1312 (e.g., ROM, EPROM, EEPROM, etc.). A basic input/output system (BIOS) can be stored in the non-volatile memory 1312, and includes the basic routines that facilitate the communication of data and signals between components within the computer 1302, such as during startup. The volatile memory 1310 can also include a high-speed RAM such as static RAM for caching data.

The system bus 1308 provides an interface for system components including, but not limited to, the memory subsystem 1306 to the processing unit(s) 1304. The system bus 1308 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1302 further includes storage subsystem(s) 1314 and storage interface(s) 1316 for interfacing the storage subsystem(s) 1314 to the system bus 1308 and other desired computer components. The storage subsystem(s) 1314 can include one or more of a hard disk drive (HDD), a magnetic floppy disk drive (FDD), and/or optical disk storage drive (e.g., a CD-ROM drive DVD drive), for example. The storage interface(s) 1316 can include interface technologies such as EIDE, ATA, SATA, and IEEE 1394, for example.

One or more programs and data can be stored in the memory subsystem 1306, a removable memory subsystem 1318 (e.g., flash drive form factor technology), and/or the storage subsystem(s) 1314 (e.g., optical, magnetic, solid state), including an operating system 1320, one or more application programs 1322, other program modules 1324, and program data 1326.

The aforementioned application programs 1322, program modules 1324, and program data 1326 can include the computer-implemented system 100 of FIG. 1, to include the communications component 102, the IP-based communication 104, the call representative 106, the call party 108, the identification component 110, the identification information 112, and the connected call party 114, the entities and components of system 200 of FIG. 2, including the multiple connected call parties 202, the delegation component 204, and the authorization component 206, the entities and components of system 300 of FIG. 3, to include the delegation component 302, the call representative 304, the IP call 306, the call party 308, the IP-telephony component 310, the identification component 312, the representation notification 314, and the connected call party 316, the system 400 of FIG. 4, including the authorization component 402, the extended delegation component 404, the extended call representative 406, the display component 408, the IP telephone 410, and the header 412, the SIP invite 500 of FIG. 5, the 200 OK message 600 of FIG. 6, the C3P invite 700 and the multiple connected parties 702 of FIG. 7.

The aforementioned application programs 1322, program modules 1324, and program data 1326 can also include the call flow diagram 1000 and entities of FIG. 10, the call flow diagram 1200 and entities of FIG. 12, and the methods of FIGS. 8 and 9, for example.

Generally, programs include routines, methods, data structures, other software components, etc., that perform particular tasks or implement particular abstract data types. All or portions of the operating system 1320, applications 1322, modules 1324, and/or data 1326 can also be cached in memory such as the volatile memory 1310, for example. It is to be appreciated that the disclosed architecture can be implemented with various commercially available operating systems or combinations of operating systems (e.g., as virtual machines).

The storage subsystem(s) 1314 and memory subsystems (1306 and 1318) serve as computer readable media for volatile and non-volatile storage of data, data structures, computer-executable instructions, and so forth. Computer readable media can be any available media that can be accessed by the computer 1302 and includes volatile and non-volatile media, removable and non-removable media. For the computer 1302, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1302, programs, and data using external user input devices 1328 such as a keyboard and a mouse. Other external user input devices 1328 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1302, programs, and data using onboard user input devices 1330 such a touchpad, microphone, keyboard, etc., where the computer 1302 is a portable computer, for example. These and other input devices are connected to the processing unit(s) 1304 through input/output (I/O) device interface(s) 1332 via the system bus 1308, but can be connected by other interfaces such as a parallel port, IEEE 1394 serial port, a game port, a USB port, an IR interface, etc. The I/O device interface(s) 1332 also facilitate the use of output peripherals 1334 such as printers, audio devices, camera devices, and so on, such as a sound card and/or onboard audio processing capability.

One or more graphics interface(s) 1336 (also commonly referred to as a graphics processing unit (GPU)) provide graphics and video signals between the computer 1302 and external display(s) 1338 (e.g., LCD, plasma) and/or onboard displays 1340 (e.g., for portable computer). The graphics interface(s) 1336 can also be manufactured as part of the computer system board.

The computer 1302 can operate in a networked environment (e.g., IP) using logical connections via a wired/wireless communications subsystem 1342 to one or more networks and/or other computers. The other computers can include workstations, servers, routers, personal computers, microprocessor-based entertainment appliance, a peer device or other common network node, and typically include many or all of the elements described relative to the computer 1302. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1302 connects to the network via a wired/wireless communication subsystem 1342 (e.g., a network interface adapter, onboard transceiver subsystem, etc.) to communicate with wired/wireless networks, wired/wireless printers, wired/wireless input devices 1344, and so on. The computer 1302 can include a modem or has other means for establishing communications over the network. In a networked environment, programs and data relative to the computer 1302 can be stored in the remote memory/storage device, as is associated with a distributed system. It will be appreciated that the network connections shown are exemplary and other means of establishing a communications link between the computers can be used.

The computer 1302 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 14:
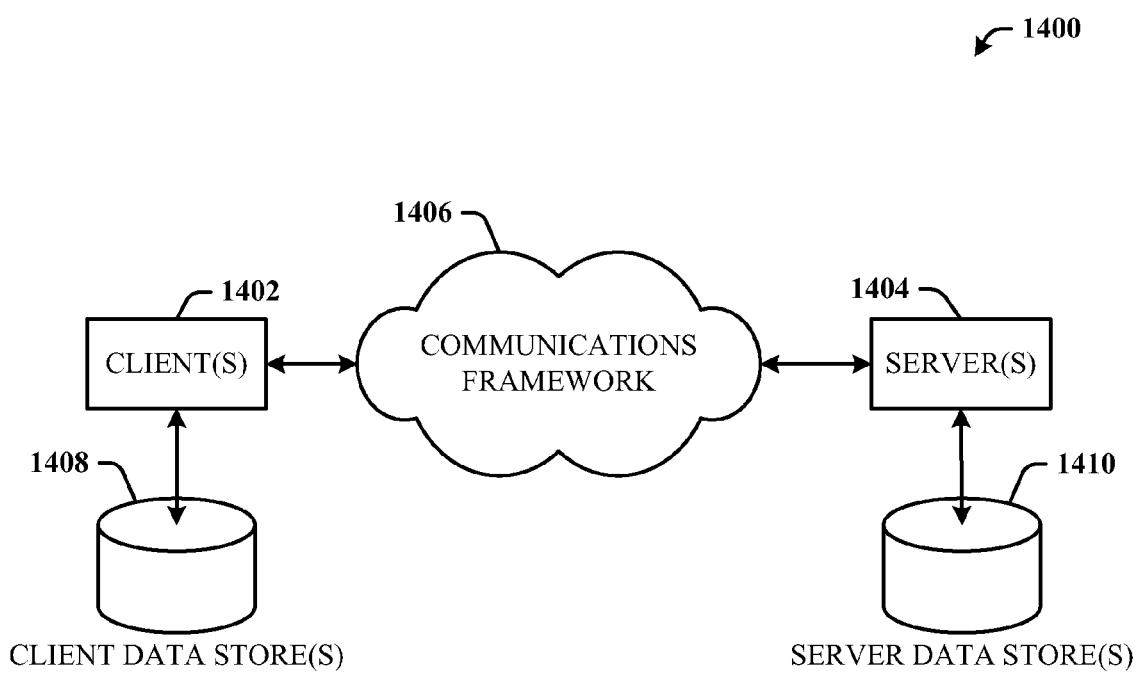
FIG. 14 illustrates an exemplary computing environment operable to provide communications delegation.

Referring now to FIG. 14, there is illustrated a schematic block diagram of a computing environment 1400 that performs communications delegation. The environment 1400 includes one or more client(s) 1402. The client(s) 1402 can be hardware and/or software (e.g., threads, processes, computing devices). The client(s) 1402 can house cookie(s) and/or associated contextual information, for example.

The environment 1400 also includes one or more server(s) 1404. The server(s) 1404 can also be hardware and/or software (e.g., threads, processes, computing devices). The servers 1404 can house threads to perform transformations by employing the architecture, for example. One possible communication between a client 1402 and a server 1404 can be in the form of a data packet adapted to be transmitted between two or more computer processes. The data packet may include a cookie and/or associated contextual information, for example. The environment 1400 includes a communication framework 1406 (e.g., a global communication network such as the Internet) that can be employed to facilitate communications between the client(s) 1402 and the server(s) 1404.

Communications can be facilitated via a wire (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented communications system, comprising:
   a communications component configured to enable participation in an IP-based communication by a call representative on behalf of a call party;
   an identification component configured to automatically present identification information of the call representative to a connected call party of the IP-based communication;
   a delegation component configured to delegate authority from the call party to the call representative to participate in the IP-based communication on behalf of the call party, and thereby establish an on-behalf-of delegation context in which capabilities and permissions of the call party are transferred to the call representative, wherein the delegation context comprises delegation in modality chaining in which capabilities and permissions of other modalities of communication are enabled on behalf of the call party during the IP-based communication, wherein the modalities comprise at least one of messaging, content sharing, recorded information, collaboration information, or application sharing;
   an extended delegation component configured to enable the call representative to further transfer the delegation context to an extended call representative; and
   a microprocessor configured to execute computer-executable instructions stored in a memory, the instructions executed to enable at least the delegation component.

2. The system of claim 1, wherein the IP-based communication further comprises a party-to-party IP telephone call with a single connected call party.

3. The system of claim 1, wherein the IP-based communication further comprises a multipoint conference with multiple connected call parties.

4. The system of claim 1, wherein the call party is an individual within a huntgroup.

5. The system of claim 1, wherein the delegation component is further configured to delagate the call representative to initiate or answer the IP-based communication on behalf of the call party.

6. The system of claim 1, further comprising an authorization component configured to authorize insertion of the identification information via the identification component.

7. A computer-implemented communications system, comprising:
   a delegation component configured to delegate a call representative to initiate or answer an IP call on behalf of a call party and thereby establish an on-behalf-of delegation context in which capabilities and permissions of the call party are transferred to the call representative, and to delegate authority to the call representative to schedule meetings and perform session functions including at least one of session termination, record keeping and storage, session document dissemination, or invite attendees, wherein the delegation context comprises delegation in modality chaining in which capabilities and permissions of other modalities of communication are enabled on behalf of the call party during the IP call;
   an extended delegation component configured to enable the call representative to transfer the delegation context to an extended call representative, to thereby enable the call representative to further delegate an extended call representative to initiate or answer the IP call on behalf of the call party, and to further delegate authority to the extended call representative to schedule the meetings and perform the session functions, to thereby enable a sequential chain of delegation;
   an IP-telephony component configured to initiate or answer the IP call by the call representative on behalf of the call party;
   an identification component configured to present a representation notification that identifies the call representative to a connected call party of the IP call; and
   a microprocessor configured to execute computer-executable instructions stored in a memory, the instructions executed to enable at least the delegation component.

8. The system of claim 7, further comprising an authorization component configured to enable the call party to authorize the identification component to present the representation notification of the call representative to the connected call party.

9. The system of claim 7, further comprising a display component configured to display the representation notification of the call representative on an IP telephone of the connected call party.

10. The system of claim 7, wherein the delegation component employs a P-session-on-behalf-of header for delegation, the header utilized in scheduling a meeting of which the call is utilized.

11. The system of claim 7, further comprising a session initiation protocol (SIP) invite that includes the representation notification upon initiation of the IP call to a single connected call party and a SIP 200 OK message that includes the representation notification upon answering the IP call from a single connected call party.

12. The system of claim 7, wherein the delegation component is further configured to extend delegation of the call to include delegation of new modalities accessible by the call party, the new modalities comprising messaging, content sharing, recorded information, collaboration information, and application sharing.

13. The system of claim 7, further comprising a centralized conferencing control protocol (C3P) invite message for presenting the representation notification to multiple call parties.

14. A computer-implemented communications method, comprising acts of:
   delegating authority to a call representative to schedule meetings and perform session functions including at least one of session termination, record keeping and storage, session document dissemination, or invite attendees, and thereby establish an on-behalf-of delegation context in which capabilities of a call party are transferred to the call representative, wherein the delegation context further comprises other modalities of communication performed by the call representative on behalf of the call party during the IP call, wherein the modalities comprise at least one of messaging, content sharing, recorded information, collaboration information, or application sharing;
   delegating the call representative to represent the call party in the IP call;
   commencing the IP call by the call representative on behalf of the call party;
   presenting a representation notification identifying the call representative to a connected call party of the IP call;
   enabling the call representative to transfer the delegation context to an extended call representative and thereby further delegate an extended call representative to initiate or answer the IP call on behalf of the call party, and to enable the call representative to further delegate authority to the extended call representative to schedule the meetings and perform the session functions; and configuring a microprocessor to execute instructions stored in a memory, the instructions executed to enable at least the acts of delegating the authority and delegating the call.

15. The method of claim 14, further comprising commencing a party-to-party IP telephone call between the call representative and a single connected call party.

16. The method of claim 14, further comprising commencing a multipoint conference between the call representative and multiple connected call parties.

17. The method of claim 14, further comprising maintaining delegation context when transferring the call between the call representative and the call party.

18. The method of claim 14, further comprising authorizing delegation of the call representative to represent the call party to the connected call party in the IP call.

19. The method of claim 14, further comprising applying permissions allowed by the call party to the connected call party, to the call representative.

20. The method of claim 14, wherein the further delegation of the extended call representative is performed by at least one of the call party or the call representative.

* * * * *